United States Patent [19]

Lehtonen et al.

[11] Patent Number: 4,996,062

[45] Date of Patent: Feb. 26, 1991

[54] GLUCOSE OXIDASE FOOD TREATMENT AND STORAGE METHOD

[75] Inventors: Paavo Lehtonen, Niittypolku; Pirkko Aaltonen, Konalantie; Ulla Karilainen, Porvoonkatu, all of Finland

[73] Assignee: Stabra AG, Zug, Switzerland

[21] Appl. No.: 263,811

[22] Filed: Oct. 28, 1988

[51] Int. Cl.$^5$ ............................................... A23B 4/22
[52] U.S. Cl. .......................................... 426/8; 426/10; 426/18; 426/42; 426/52; 426/56; 426/61; 426/321
[58] Field of Search ............... 426/61, 4, 8, 18, 10–12, 426/49, 42, 51, 52, 61, 599, 321, 330, 330.2, 330.5, 334, 333, 541, 590, 592, 594–596, 580, 588, 56

[56] References Cited

U.S. PATENT DOCUMENTS

| | | | |
|---|---|---|---|
| 2,482,724 | 9/1949 | Baker | 426/10 |
| 2,940,860 | 6/1960 | Sarett | 426/10 |

FOREIGN PATENT DOCUMENTS 2520792 11/1976 Fed. Rep. of Germany ........ 426/10

*Primary Examiner*—Marianne Cintins
*Attorney, Agent, or Firm*—Kenyon & Kenyon

[57] ABSTRACT

The invention relates to an enzymatic composition and method of extending the shelf life of foodstuffs. The composition contains a glucose oxidase/catalase enzyme preparation. The method can be used both in normal and modified atmosphere packages.

7 Claims, No Drawings

GLUCOSE OXIDASE FOOD TREATMENT AND STORAGE METHOD

BACKGROUND OF THE INVENTION

The present invention relates to the extension of the shelf life of packaged, prepared foods, such as meat-and broiler patties, smoked fish, mayonnaise based vegetable salads, as well as sausages, bread, and egg-butter by reducing the oxygen content with an enzymatic method.

The invention also relates to a method for extending the shelf-life of foods, whereby an enzymatic reaction creates an environment within the foodstuff that is both microbicidal and microbistatic.

The invention further relates to the use of an enzymatic method to reduce the population of pathogenic and food-spoilage microorganisms within a food product.

The invention also relates to the use of this enzymatic method alone or together with a modified atmosphere packaging technology.

The shelf life of a food product is most often dependent on the rate of microbiological spoilage. Both the characteristics of the food product itself, such as water activity, pH, redox potential, antimicrobial agents, chemical and biological composition of the product, as well as the environment in which it is stored (temperature, humidity and the gas composition of the package) effect the rate of spoilage.

In some cases preservatives can be added to prohibit both the growth of microorganisms and the production of toxins harmful to humans. The most widely used preservatives are benzoic acid and sodium benzoate, ethyl-, methyl- and propylparabens, sorbic acid and calcium, sodium and potassium sorbates, as well as propionic acid and calcium, sodium and potassium propionates.

Benzoic acid and sodium-benzoate can be used in products with low pH values, the greatest activity being at pH values below 4.5. At neutral pH values these compounds are essentially ineffective. This restricts the use of benzoic acid and sodium benzoate to the high-acid products such as salad dressings, soft drinks and tomato catsup. The problem with soft drinks is that the benzoates may impart a disagreeable taste at very low levels.

Ethyl-, methyl- and propylparabens are less sensitive to pH than benZoic acid and benzoates. The use of these preservatives in most foods is, however, strictly prohibited by law in many countries.

Sorbic acid and sorbates are the most widely used preservatives. Their antimicrobial activity is also dependent on the pH value but unlike benzoic acid and benzoates they still work at pH values 6.0–6.5. The use of sorbates as food preservatives is limited by law to particular food products. In many countries, it is not allowed in prepared foods such as those described in the present invention.

Propionic acid and propionates are mainly used in bread and other grain products to prevent molding. In general, most countries limit the use of propionates to these types of products.

Although many of the above mentioned chemical preservatives are effective in preventing microbial growth and therefore extending the shelf-life of food products in which they are used, increased awareness of the health risks associated with such preservatives is currently leading to greater restrictions on their use. Commonly used preservatives such as sulfites have been found to cause allergic reactions in unsuspecting consumers. Even in cases where a preservative has been found to be safe, "health conscious" consumers and consequently food producers have sought to find more "natural" methods of storing foods.

One such method is by the removal of oxygen. Because many of the microorganisms that are responsible for the spoilage of food require oxygen to grow, their growth in food products can be restricted or, in some cases, completely halted by the elimination of oxygen from the environment in which they are stored.

Oxygen removal has been suggested for the purpose of minimizing detrimental oxidative processes in food. For example, processed foods have been packaged either in a vacuum or in a modified atmosphere. It is also possible to employ oxygen absorbing agents such as iron powder, (Prepared Foods 3:91–98 (1988) or sulfites or ascorbic acid (Food Technology 40:94–97, 100–102 (1988) Within the food package. However, several problems are attendant with such oxygen removal methods.

The level of injurious free oxygen is reduced in vacuum-packaging technology, thus decreasing the rates of microbiologal spoilage and oxidative reactions. The problems with vacuum-packing are that prepared foods with round shape tend to flatten, slices stick together and liquid frequently is drawn out of the product. Fresh meat also looses its color when vacuum-packaged.

In modified atmosphere packaging, the shelf life of a product can be extended over that in air. The suitable gas composition depends on the product. The most common gas compositions are 20% $CO_2$ + 80% $O_2$, 20% $CO_2$ + 80% $N_2$, 100% $N_2$, and different combinations of the three gases $O_2$, $CO_2$ and $N_2$. The problem with modified packaging technology is that great amounts of carbon dioxide cause discoloration and packages shrink when $CO_2$ is absorbed by the product. In some cases, the $CO_2$ can cause off-odors when the package is opened, and $CO_2$ can have an off-flavor. The amount of residual oxygen is at times sufficient to cause oxidative reactions. In such cases, it can be removed with oxygen absorbers such as iron powder, sulfites, ascorbic acid or glucose oxidase.

The use of oxygen absorbers such as iron powder, ascorbic acid or sulfites are also problematic. The addition of ascorbic acid is regulated by law and it is not always possible to add enough ascorbic acid to prevent all oxidative reactions. Sulfites react with oxygen producing many harmful by-products and sulfites alone can cause off odors and allergic reactions. When using iron powder care must be taken that the product is not commingled with the food.

Enzyme systems have been suggested for the removal of oxygen from packaged foods. Such systems have, however, been wrought with difficulty as the necessary combinations of enzymes, enzyme levels necessary to ensure the creation of the desired conditions, necessary reactants, and other factors necessary to make such enzyme systems workable have not been determined. As a result, these methods have not, to date, been successful for either preserving food products or presenting a consumable product.

Recently, significant production breakthroughs have enabled the production of high yields of purified, highly active glucose oxidase that contains little or no contamination with the enzyme catalase. This has made it possible to develop complex enzyme compositions that solve the foregoing difficulties.

It is therefore, the object of this invention to present an enzymatic method to preserve foodstuffs whereby carefully controlled levels of glucose oxidase and catalase are added to increase the shelf life of food products.

It is also the object of this invention to provide a method whereby glucose oxidase is added to the food product to reduce the oxygen level below 1%, thereby inhibiting the growth of aerobic spoilage-causing microorganisms.

A further object of the invention is to introduce an enzymatic method whereby catalase is introduced to a food product in combination with glucose oxidase to eliminate residual peroxide created by the reaction of glucose oxidase with glucose and oxygen.

The object of the invention is further to provide a method whereby glucose oxidase and glucose are added to a food product along with low levels of catalase, such that the microbicidal effect of the hydrogen peroxide on both food spoilage as well as pathogenic microorganisms can be accomplished prior to its elimination by the catalase.

A further object of the invention is to provide packaging technology wherein residual oxygen is removed from a food package using a glucose oxidase enzyme preparation.

SUMMARY OF THE INVENTION

According to the invention, when the object is the inhibition of growth of aerobic spoilage organisms, a composition containing a mixture of the enzymes glucose oxidase and catalase is added to a foodstuff, which is then enveloped in a sealed package with air or a substantially non-reactive atmosphere. Preferably, the package may be air tight but controlled leakage of air into the package can be accomodated by this method. The composition causes removal of oxygen from the air in the package.

The amount of glucose oxidase added is based on the air volume of the foodstuff package. Typically, about 200 to about 1500 units of enzyme are added per liter of air in the package. It is especially preferred to use between about 300 and about 800 units of enzyme per liter of package air to ensure adequate removal of oxygen without leaving excess glucose oxidase when the package is opened. Under such circumstances, excess enzyme can cause rapid production of acid thus causing off flavors in the food.

Because the relative amounts of glucose oxidase and catalase are an important feature of the invention, it is most preferred to use a highly purified glucose oxidase preparation that is essentially free from contamination by catalase.

When the desired result is removal of oxygen, the ratio of glucose oxidase to catalase used is about 1:1 to 100:1, most preferably between about 3:1 and about 6:1.

Preferably, glucose is also combined with the enzyme mixture to form the composition to be added to the foodstuff. To ensure complete removal of oxygen from the product headspace, glucose is added to achieve a concentration in the food of at least 3.0 grams of glucose per liter of package oxygen with the preferred level being about 6.0 grams of glucose per liter of package oxygen.

When the object according to the invention is direct reduction of the microbial load of the food, the amount of glucose oxidase added is determined based on the volume of the food. To ensure adequate reaction of the glucose oxidase within the microenvironment of the food product, the enzyme is added at a level of 10 to 1000 units per kilogram of food. Although the optimal quantities depend on the consistency of the food, as well as other conditions such as pH, temperature, etc., the most preferred level of enzyme for most applications is about 15–50 units per kilogram.

When a reduction of the microbial load of the food and removal of oxygen from the product and its package headspace are desired, the glucose oxidase to catalase ratio can be adapted to maximize the exposure of susceptible microorganisms to hydrogen peroxide, a product of the glucose oxidation process, prior to its breakdown by catalase. A preferred ratio of at least 5:1 glucose oxidase to catalase is used to accomplish this objective. The most preferred ratio is about 7:1 to about 100:1 glucose oxidase to catalase.

Under this embodiment of the invention for directly reducing the microbial load, it is preferable to add glucose to the product at a level of from about 0.2 to about 1.0 gram per liter of food.

It is preferred to combine the glucose oxidase, catalase and glucose into a single composition to be added to the food product. Most preferably the composition containing enzymes and glucose is combined with the product when it is prepared. Alternatively, the composition can be sprayed or spread onto the surface of the food product.

Where the main objective is to maximize reduction of the microbial population of the food product prior to packaging, without reducing substantially the oxygen content of package air, the product can be treated with glucose oxidase, then subsequently treated with catalase and packaged.

Yet another preferred embodiment of the method is to incorporate a glucose oxidase/glucose mixture into a product package to ensure removal of oxygen from the product headspace. Preferably the level of glucose oxidase incorporated is about 200 to about 1500 units per liter of package headspace. According to this embodiment, the glucose oxidase can be incorporated into a discrete compartment of the package, or it can be incorporated into a sealable packaging material which can be used to envelope the product. Glucose is also incorporated into the package such that it can be allowed to react with the enzyme and the package oxygen.

DETAILED DESCRIPTION OF THE INVENTION

The present invention extends the shelf life of prepared foods, such as fish-, meat- and broiler patties, different kinds of meat rolls, as well as smoked fish, sausages, bread and egg-butter by removing oxygen from the package air space surrounding the prepared food, and/or by creating a microbicidal environment within the food product. The microbicidal environment is effective in reducing both the level of food spoilage and the level of pathogenic microorganisms in the food stuff. The invention employs an enzyme composition that can be combined with the prepared food or the package material. The composition is harmless to humans and mammals and can be consumed.

Although not intended to be a limitation of the invention, the invention is based on the recognition that the reaction of glucose and oxygen as catalyzed by the enzyme glucose oxidase is effective in several ways in preserving the shelf-life of food stuffs.

The invention is based on the known reaction in which glucose oxidase catalyzes the reaction between glucose and oxygen. In the reaction D-gluconic acid and hydrogen peroxide are produced according to equation (1). The reaction continues until either glucose or oxygen is consumed. Hydrogen peroxidase is decomposed by catalase into water and oxygen (2).

$$\text{D-glucose} + O_2 \xrightarrow{\text{glucose oxidase}} \text{D-gluconic acid} + H_2O_2 \quad (1)$$

$$H_2O_2 \xrightarrow{\text{catalase}} H_2O + \tfrac{1}{2} O_2 \quad (2)$$

The present invention employs this reaction to increase the shelf life of foods both by creating an environment that is not conducive to microbial growth and by producing products that have a microbicidal effect thus lowering the bacterial load. Such microbes include but are not limited to *Camphylobacter jejuni, Yersinia enterocolitica, Listeria monocytogenes, Staphylococcus aureus, Shigella dysenteriae, Bacillus cereus, Salmonella typhi* and *paratyphi, Vibrio parahemolyticus, Escherichia coli, Pseudomonas putida* and *Aspergillus flavus.*

The removal of oxygen from the package headspace of the food product as well as from within the product itself creates an environment that prevents the growth of aerobic spoilage organisms. In addition, gluconic acid, the oxidation product of glucose, reduces the pH of the food product, thus creating less favorable conditions for many common spoilage bacteria. This antimicrobial effect is further fortified by hydrogen peroxide, a byproduct of the glucose oxidase reaction which can effectively eliminate pathogenic organisms as well as organisms that cause the product to spoil during storage. In addition, the glucose oxidase removes glucose from the food product, thus causing selective pressure against glucose-dependent microorganisms in the food.

According to the invention, the amount of glucose oxidase to be added to the product to remove oxygen is dependent upon the oxygen or air present in the product headspace. The amount is calculated to deliver units of glucose oxidase, relative to the original air volume in the package, of no less than 200 U/liter air, preferably 300–800 U/liter air. The amount of glucose oxidase present is suitable when it reduces the amount of oxygen to under 1% within 5 days, preferably within 0.2–2 days.

The enzyme composition can be added either as liquid or powder. The liquid form is prepared by combining the mixture of the enzymes glucose oxidase and catalase with water, buffering agents or stabilizers and other enzymes or glucose if needed. The powder form can be prepared by combining the mixture of enzymes with a carrier, such as starch, talc, cellulose or other inert solid material. With both forms the portions of mixture and liquid or solid ingredients can be adjusted to provide the appropriate, desired delivery of the enzyme mixture to the foodstuff. Preferably, proportions can be calculated to deliver a minimum amount of carrier or inert ingredient and a maximum amount of enzyme mixture. If needed, glucose is also added in order to achieve a minimum glucose content of 3.5 g/L air, preferably 5–6 g/L air in the package to ensure use of all headspace oxygen.

According to the invention, if the desired result is to create a microbicidal environment within the food product, the amount of glucose oxidase and glucose that must be used are calculated to deliver a concentration of about 10 to about 1000 units per kilogram of food, with the preferred level being about 15–50 units per kilogram. Glucose is also added based on the quantity of the food product, preferably it is added to achieve a concentration of between 0.2 and 1.0 grams per liter. It should be appreciated that the levels of glucose oxidase and glucose necessary may vary depending on the amount of headspace in the product package. Thus ideally a sufficient amount of enzyme and glucose is used to ensure use of headspace and product oxygen as well as adequate production of glucose oxidative products in the foodstuff.

According to the invention, it has also been determined that the ratios of glucose oxidase to catalase can be varied depending on whether the desired effect is elimination of oxygen or creation of a microbicidal environment, or both.

According to the invention, enzyme compositions containing both glucose oxidase and catalase have been developed to take advantage of the above-described activities depending on the particular type of food to be preserved and the packaging conditions. For example, if the desired result is to prevent the growth of aerobic organisms by providing an environment within a food product and its package headspace that contains minimal oxygen, substantially equal levels of glucose oxidase and catalase can be used. Such levels will cause rapid reaction of the environmental oxygen with glucose, and will immediately convert the resultant hydrogen peroxide to water and oxygen. The removal of hydrogen peroxide is not only important for the safety of the foods, but also to prevent inactivation of the enzyme composition. Relative to the air volume of the foodstuff packaging, the amount of enzyme mixture added provides activity of glucose oxidase within the range of about 200 to 1500 Units per liter of air in the package.

According to the invention, the glucose oxidase/catalase composition is most easily mixed with the food product during its preparation. When prevention of surface growth of organisms such as molds is desired, the enzyme composition can alternatively be applied to the surface of the product, e.g. by spraying. In another embodiment, the glucose oxidase composition can be incorporated into the package prior to addition of the food product. Such a system can be used to eliminate oxygen from the package, without the necessity for catalase.

In other cases, the desired result is a reduction of the microbial load of the product. A reduction in the population of food spoilage microorganisms increases the shelf-life of the food product. The method described herein provides a safe and effective means whereby food products can be treated with hydrogen peroxide produced as a byproduct of the glucose oxidase reaction. Such a method removes pathogenic microorganisms and is especially useful when the product cannot be treated by traditional means such as heat. In such cases, it is preferred to allow the hydrogen peroxide to exhibit its antimicrobial effect prior to its elimination by catalase. This is accomplished by adding catalase, in conjunction with glucose oxidase, at levels that are sufficient to eliminate the hydrogen peroxide prior to consumption of the product, but low enough to maximize exposure of the organisms in the food to the peroxide. Ratios of glucose oxidase to catalase of at least 5:1 have been found to best accomplish this objective, with 7:1 to 100:1 being the most preferred relative amount.

Alternatively, the food product can be treated first with glucose oxidase, followed by treatment with catalase and packaging. In this way, the exposure of the product to the glucose oxidation products is maximized, and levels of catalase can be used to ensure removal of residual peroxide.

Because the activity of the enzyme is highly dependent upon the environmental conditions both within the product, such as pH and moisture and the external conditions, such as the temperature at which the product is stored, it should be appreciated that the levels of enzyme used and the relative amounts of glucose oxidase to catalase can vary from a ratio of about 1:1 to about 100:1.

As an alternative to combining the enzyme composition with the food product, the composition described herein can be incorporated into a food product package to remove oxygen from the product headspace The composition can be incorporated into a discrete compartment within the package, such as in the lid, prior to sealing. Alternatively, it can be added to a mid-layer of a multi-layer package, the inner layers being gas permeable and the outer layers being substantially gas impermeable.

In another embodiment the composition can be incorporated into a packaging material which can then be used to wrap the product. Typically it can be incorporated as a thin film between multiple layers of such packaging material, the inner layers of which are gas permeable and the outer layers of which are substantially gas impermeable. Also it can be incorporated into a gas permeable matrix layer of such a multiple layer material. In such cases, care must be taken to avoid sealing with heat such that the enzyme is inactivated.

Although it is most preferred that the package be completely sealed to the influx of air, the enzyme composition can accomodate some degree of air leakage during storage of the package. Consequently, the packaging material in all cases can be air permeable to some extent. That extent is preferably known so that the amount of composition present can be adjusted to account for the air leakage into the package. As used in this application, the term "sealed package" is intended to cover all contemplated variations of air permeability and impermeability.

The levels and ratios of glucose oxidase to catalase are an important feature of the invention claimed herein. Although it is contemplated that a wide variety of commercially available enzymes can be used to accomplish the objectives of the present invention, the amount of enzymes used will vary depending on the activity of the enzyme preparation.

Unit activities can be measured and reported in several ways, such as International Units or units as designated by commercial enzyme producers. A unit of glucose oxidase, as described herein, is defined as the amount of enzyme required to use 10 microliters of oxygen per minute with a substrate containing 3.3% glucose in phosphate buffer, pH 5.9 at 35° C. in the presence of excess oxygen. A unit of catalase activity is defined as the amount of enzyme which degrades about 60 micromoles of hydrogen peroxide in one minute under assay conditions.

The composition and the method of the invention are further illustrated by the following examples. These examples are not meant to be limitations of the invention which is fully disclosed above.

EXAMPLE 1

390 U glucose oxidase which was diluted in 58% glucose syrup was added in 400 g of broiler patties before packing them in normal atmosphere. When the broiler patties were packed in modified atmosphere (100% $CO_2$) the dosage was 100 U of the same enzyme preparation. The glucose oxidase catalase ration in the preparation was 70:1. The enzyme was sterile filtrated and spread on the surface of the patties.

The broiler patties were packed with Dyno-packing machine, headspace being 750 ml and stored at +4° C. The oxygen content, pH and total microbial count were measured after 1, 5, 11, 15, 19 and 25 days. The results were compared to control sample which was not treated with glucose oxidase and represented the normal spoilage pattern. The results are shown in table 1 and 2.

In a typical method for application, the solid or liquid form of the enzyme mixture is coated onto the foodstuff surfaces as a thin film. The coated foodstuff is then packaged in an inert air package. Stability tests have shown that this method improves foodstuff shelf life several fold.

TABLE 1 pH, oxygen content and total microbial count of broiler patties packed in air

| Time/ days | Control | | | Sample treated with glucose oxidase | | |
| --- | --- | --- | --- | --- | --- | --- |
| | pH | $O_2$% | total count cfu/g | pH | $O_2$% | total count cfu/g |
| 1 | 6.5 | 19.3 | $2.9 \times 10^3$ | 6.4 | 6.0 | $5.9 \times 10^3$ |
| 5 | 6.4 | 18.5 | $1.2 \times 10^4$ | 5.8 | 0.0 | $1.2 \times 10^4$ |
| 11 | 6.4 | 17.4 | $1.8 \times 10^4$ | 5.2 | 0.0 | $8.5 \times 10^3$ |
| 15 | 6.4 | 16.6 | $1.8 \times 10^5$ | 5.9 | 0.0 | $3.8 \times 10^3$ |
| 19 | 6.4 | 14.8 | $4.9 \times 10^6$ | 5.9 | 0.0 | $9.7 \times 10^3$ |
| 25 | 6.3 | 12.1 | $2.2 \times 10^7$ | 5.5 | 0.0 | $1.8 \times 10^5$ |

TABLE 2 pH, oxygen content and total microbial count of broiler patties packed in 100% $CO_2$

| Time/ days | Control | | | Sample treated with glucose oxidase | | |
| --- | --- | --- | --- | --- | --- | --- |
| | pH | $O_2$% | total count cfu/g | pH | $O_2$% | total count cfu/g |
| 1 | 6.3 | 1.2 | $2.6 \times 10^3$ | 6.3 | 0.2 | $3.4 \times 10^3$ |
| 5 | 6.4 | 0.7 | $4.0 \times 10^3$ | 6.3 | 0.0 | $5.5 \times 10^3$ |
| 11 | 6.2 | 0.3 | $3.8 \times 10^3$ | 6.3 | 0.0 | $5.0 \times 10^3$ |
| 15 | 6.3 | 0.2 | $8.7 \times 10^4$ | 6.2 | 0.0 | $2.1 \times 10^4$ |
| 19 | 6.2 | 0.3 | $1.6 \times 10^6$ | 6.2 | 0.0 | $2.8 \times 10^5$ |
| 25 | 6.3 | 0.2 | $1.4 \times 10^6$ | 6.3 | 0.0 | $9.0 \times 10^5$ |

EXAMPLE 2

400 g of broiler sausages were treated with glucose oxidase the same way as broiler patties in the example 1. Sausages were also packed both in normal and modified (100% $CO_2$) atmosphere. The results are presented in tables 3 and 4.

TABLE 3 pH, oxygen content and total microbial count of broiler sausages in packed in air.

| Time/ days | Control | | | Sample treated with glucose oxidase | | |
|---|---|---|---|---|---|---|
| | pH | $O_2\%$ | total count cfu/g | pH | $O_2\%$ | total count cfu/g |
| 1 | 6.2 | 19.9 | $6.7 \times 10^3$ | 6.2 | 15.8 | $7.4 \times 10^3$ |
| 5 | 6.3 | 18.5 | $3.0 \times 10^4$ | 6.2 | 9.0 | $1.6 \times 10^4$ |
| 11 | 6.2 | 16.8 | $2.0 \times 10^4$ | 6.1 | 2.4 | $9.1 \times 10^3$ |
| 15 | 6.3 | 15.1 | $6.6 \times 10^4$ | 6.2 | 1.9 | $4.9 \times 10^4$ |
| 19 | 6.1 | 14.1 | $1.2 \times 10^5$ | 6.0 | 0.0 | $2.9 \times 10^4$ |
| 25 | 6.1 | 9.0 | $3.5 \times 10^7$ | 6.0 | 0.0 | $1.0 \times 10^5$ |

TABLE 4 pH, oxygen and total microbial count of broiler sausages packed in 100% $CO_2$

| Time/ days | Control | | | Sample treated with glucose oxidase | | |
|---|---|---|---|---|---|---|
| | pH | $O_2\%$ | total count cfu/g | pH | $O_2\%$ | total count cfu/g |
| 1 | 6.2 | 1.2 | $5.5 \times 10^3$ | 6.2 | 0.3 | $7.3 \times 10^3$ |
| 5 | 6.2 | 0.8 | $1.9 \times 10^4$ | 6.2 | 0.1 | $1.0 \times 10^4$ |
| 11 | 6.1 | 0.6 | $1.1 \times 10^4$ | 6.1 | 0.0 | $7.5 \times 10^3$ |
| 15 | 6.2 | 0.4 | $4.8 \times 10^4$ | 6.1 | 0.0 | $6.9 \times 10^3$ |
| 19 | 6.1 | 0.4 | $3.3 \times 10^5$ | 6.1 | 0.0 | $6.3 \times 10^3$ |
| 25 | 6.1 | 0.3 | $4.7 \times 10^5$ | 6.0 | 0.0 | $1.0 \times 10^4$ |

EXAMPLE 3

400 g of smoked rainbow trout was treated with glucose oxidase the same way as broiler patties and sausages in examples 1 and 2. The fish was packed both in normal and modified (100%A $CO_2$) atmosphere. The results are shown in tables 5 and 6.

TABLE 5 pH, oxygen content and total microbial count of smoked rainbow trout packed in air

| Time/ days | Control | | | Sample treated with glucose oxidase | | |
|---|---|---|---|---|---|---|
| | pH | $O_2\%$ | total count cfu/g | pH | $O_2\%$ | total count cfu/g |
| 1 | 6.0 | 20.3 | $4.0 \times 10^4$ | 5.8 | 11.8 | $6.3 \times 10^4$ |
| 5 | 5.9 | 20.0 | $4.0 \times 10^5$ | 5.8 | 9.9 | $3.8 \times 10^4$ |
| 11 | 5.9 | 19.2 | $1.3 \times 10^7$ | 5.2 | 6.2 | $1.1 \times 10^5$ |
| 15 | 5.9 | 18.5 | no growth | 5.6 | 3.5 | no growth |
| 19 | 6.4 | 18.4 | $3.6 \times 10^7$ | 5.3 | 1.5 | $5.5 \times 10^2$ |
| 25 | 5.8 | 9.6 | $9.0 \times 10^6$ | 5.7 | 0.0 | $4.6 \times 10^6$ |

TABLE 6 pH, oxygen content and total microbial count of smoked rainbow trout packed in $CO_2$.

| Time/ days | Control | | | Sample treated with glucose oxidase | | |
|---|---|---|---|---|---|---|
| | pH | $O_2\%$ | total count cfu/g | pH | $O_2\%$ | total count cfu/g |
| 1 | 5.9 | 1.3 | $2.1 \times 10^3$ | 5.8 | 0.1 | $2.0 \times 10^2$ |
| 5 | 5.9 | 1.4 | $2.5 \times 10^5$ | 5.8 | 0.0 | $3.3 \times 10^5$ |
| 11 | 5.9 | 1.1 | $1.8 \times 10^6$ | 5.8 | 0.0 | $8.3 \times 10^3$ |
| 15 | 5.5 | 0.8 | $1.7 \times 10^6$ | 5.8 | 0.0 | no growth |
| 19 | 5.9 | 1.6 | $1.8 \times 10^6$ | 5.5 | 0.0 | no growth |
| 25 | 5.9 | 1.4 | $4.2 \times 10^7$ | 5.7 | 0.0 | $4.0 \times 10^3$ |

EXAMPLE 4

700 U glucose oxidase enzyme preparation and 10 g glucose was added in 970 g of egg-butter consisting 75% of hard-boiled eggs and 25% butter. The glucose oxidase-catalase-ratio in the preparation was 70:1. Glucose was dissolved in 20 ml of water and the enzyme preparation sterile filtrated before adding to egg-butter.

The enzyme and aqueous glucose was carefully mixed in egg-butter and the mixture was packed in 125 ml glass bottles, 50 g in each bottle. The bottles were closed with rubber caps and stored at +10° C. The growth of lactic acid bacteria and total microbial count was followed during 5 weeks. The results are shown in tables 7 and 8.

TABLE 7

Total microbial count off egg-butter

| Time/ days | Control total count cfu/g | Sample treated with glucose oxidase total count cfu/g |
|---|---|---|
| 1 | $1.65 \times 10^3$ | $1 \times 10^2$ |
| 7 | $3.55 \times 10^7$ | $<1 \times 10^2$ |
| 14 | $2.50 \times 10^8$ | $<1 \times 10^2$ |
| 21 | $5.20 \times 10^8$ | $<1 \times 10^2$ |
| 28 | $3.40 \times 10^8$ | $<1 \times 10^2$ |
| 35 | $1.80 \times 10^8$ | $<1 \times 10^2$ |

TABLE 8

Amount of lactic acid bacteria in egg-butter

| Time/ days | Control total count cfu/g | Sample treated with glucose oxidase total count cfu/g |
|---|---|---|
| 1 | $1 \times 10^3$ | $2 \times 10^2$ |
| 7 | $<1 \times 10^4$ | no growth |
| 14 | $2.1 \times 10^7$ | $<1 \times 10^2$ |
| 21 | $1.2 \times 10^8$ | $<1 \times 10^2$ |
| 28 | $2.3 \times 10^8$ | $<1 \times 10^2$ |
| 35 | $1.4 \times 10^8$ | $<1 \times 10^2$ |

EXAMPLE 5

2. Survival of Bacteria in the Presence of Glucose Oxidase and the Effect of Added Catalase Varying amounts of catalase (CAT) are found frequently in partially purified GO preparates. GO was commercial high purity *Aspergillus niger* glucose oxidase preparation made by Finnsugar and CAT was *A. niger* catalase by Finnsugar or purchased from Sigma Chemical Company. A beef liver catalase can also be used. CAT oxidizes hydrogen peroxide which is considered to be the main cytotoxic substance produced by GO. The aim of this study was to find out the amount of CAT that renders GO ineffective against bacteria.

Bacteria tested were Listeria monocytogenes RHD 374, *Pseudomonas aeruginosa* PA01, and *Escherichia coli* IH 3080. GO was a commercial glucose oxidase preparation made by Finnsugar, glucose oxidase preparation made by. CAT was *Aspergillus niger* catalase purchased from Sigma Chemical Company or Finn Sugar. The experiments were performed as checkerboard tests on microtiter plates. The plates were incubated at 37° C. for 20 h and viable counts were determined after appropriate dilutions is using a semi-quantitative spot test. The media used were Tryptic Soy Broth (TSB) and this diluted tenfold (TSB 1/0).

The results are shown as tables for each strain below:

TABLE 9

Viable counts of *L. monocytogenes* RHD 374 in TSB

| CAT, U/ml | GO, U/ml | | | | | | | |
|---|---|---|---|---|---|---|---|---|
| | 0 | 0.006 | 0.016 | 0.049 | 0.16 | 0.46 | 1.39 | 4.1 |
| 0 | $4 \times 10^8$ | $9 \times 10^8$ | $7 \times 10^6$ | <20 | <20 | <20 | <20 | <20 |
| 0.0003 | VG | $5 \times 10^8$ | $1 \times 10^8$ | $\leq 20$ | <20 | <20 | <20 | <20 |
| 0.0008 | VG | $1 \times 10^9$ | $7 \times 10^8$ | $1 \times 10^8$ | <20 | <20 | <20 | <20 |
| 0.0024 | VG | VG | $6 \times 10^7$ | $4 \times 10^3$ | <20 | <20 | <20 | <20 |
| 0.0073 | VG | VG | VG | $6 \times 10^8$ | <20 | <20 | <20 | <20 |
| 0.0221 | VG | VG | VG | $4 \times 10^8$ | $8 \times 10^7$ | $1 \times 10^8$ | $1 \times 10^8$ | $1 \times 10^8$ |
| 0.0664 | VG | VG | VG | $5 \times 10^8$ | $2 \times 10^8$ | $1 \times 10^8$ | $1 \times 10^8$ | $2 \times 10^8$ |
| 0.1995 | VG | VG | VG | VG | VG | VG | VG | VG |

TABLE 10

Viable counts of *L. monocytogenes* RHD 374 in TSB 1/10

| CAT, U/ml | GO, U/ml | | | | | | | |
|---|---|---|---|---|---|---|---|---|
| | 0 | 0.006 | 0.016 | 0.049 | 0.16 | 0.46 | 1.39 | 4.1 |
| 0 | $3 \times 10^4$ | $8 \times 10^4$ | <20 | <20 | <20 | <20 | <20 | <20 |
| 0.0003 | $3 \times 10^8$ | $1 \times 10^6$ | <20 | <20 | <20 | <20 | <20 | <20 |
| 0.0008 | VG | $1 \times 10^8$ | <20 | <20 | <20 | <20 | <20 | <20 |
| 0.0024 | VG | $2 \times 10^8$ | $1 \times 10^5$ | <20 | <20 | <20 | <20 | <20 |
| 0.0073 | VG | VG | $7 \times 10^6$ | <20 | <20 | <20 | <20 | <20 |
| 1.0221 | VG | VG | $8 \times 10^6$ | <20 | <20 | <20 | <20 | <20 |
| 0.0664 | VG | VG | $4 \times 10^6$ | <20 | <20 | <20 | <20 | <20 |
| 0.1995 | VG | VG | $2 \times 10^6$ | <20 | <20 | <20 | <20 | <20 |

TABLE 11

Viable counts of *P. aeruginosa* PA01 in TSB

| CAT, U/ml | GO, U/ml | | | | | | | |
|---|---|---|---|---|---|---|---|---|
| | 0 | 0.004 | 0.007 | 0.013 | 0.025 | 0.051 | 0.11 | 0.21 |
| 0 | $5 \times 10^9$ | VG | VG | VG | <20 | <20 | <20 | <20 |
| 0.00016 | VG | VG | VG | VG | <20 | <20 | <20 | <20 |
| 0.00031 | VG | VG | VG | VG | $5 \times 10^4$ | <20 | <20 | <20 |
| 0.00055 | VG | VG | VG | VG | <20 | <20 | <20 | <20 |
| 0.0013 | VG | VG | VG | VG | $8 \times 10^3$ | <20 | <20 | <20 |
| 0.0025 | VG | VG | VG | VG | $5 \times 10^8$ | <20 | <20 | <20 |
| 0.005 | VG | VG | VG | VG | VG | $2 \times 10^5$ | <20 | <20 |
| 0.010 | VG | VG | VG | VG | VG | VG | <20 | <20 |

TABLE 12

Viable counts of *P. aeruginosa* PA01 in TSB 1/10

| CAT, U/ml | GO, U/ml | | | | | | | |
|---|---|---|---|---|---|---|---|---|
| | 0 | 0.004 | 0.008 | 0.016 | 0.031 | 0.063 | 0.13 | 0.25 |
| 0 | VG | VG | $4 \times 10^6$ | <20 | <20 | <20 | <20 | <20 |
| 0.00016 | VG | VG | $3 \times 10^7$ | <20 | <20 | <20 | <20 | <20 |
| 0.00031 | VG | VG | $1 \times 10^7$ | <20 | <20 | <20 | <20 | <20 |
| 0.00055 | VG | VG | VG | <20 | <20 | <20 | <20 | <20 |
| 0.0013 | VG | VG | VG | $2 \times 10^5$ | <20 | <20 | <20 | <20 |
| 0.0025 | VG | VG | VG | $1 \times 10^7$ | <20 | <20 | <20 | <20 |
| 0.005 | VG | VG | VG | VG | <20 | <20 | <20 | <20 |
| 0.010 | VG | VG | VG | VG | $9 \times 10^4$ | <20 | <20 | <20 |

VG; visible growth, not plated

TABLE 13

Viable counts of *E. coli* IH 3080 in TSB

| CAT U/ml | GO, U/ml | | | | | | | |
|---|---|---|---|---|---|---|---|---|
| | 0 | 0.004 | 0.008 | 0.016 | 0.031 | 0.063 | 0.13 | 0.25 |
| 0 | $1 \times 10^9$ | VG | VG | VG | $-10^9$ | <20 | <20 | <20 |
| 0.00016 | VG | VG | VG | VG | VG | <20 | <20 | <20 |
| 0.00031 | VG | VG | VG | VG | VG | <20 | <20 | <20 |
| 0.00055 | VG | VG | VG | VG | VG | <20 | <20 | <20 |
| 0.0013 | VG | VG | VG | VG | VG | <20 | <20 | <20 |
| 0.0025 | VG | VG | VG | VG | VG | <20 | <20 | <20 |
| 0.005 | VG | VG | VG | VG | VG | VG | <20 | <20 |
| 0.010 | VG | VG | VG | VG | VG | VG | VG | <20 |

TABLE 14

Viable counts of *E. coli* IH 3080 in TSB 1/10

| CAT, U/ml | GO, U/ml | | | | | | | |
|---|---|---|---|---|---|---|---|---|
| | 0 | 0.004 | 0.008 | 0.016 | 0.031 | 0.063 | 0.13 | 0.25 |
| 0 | $3 \times 10^8$ | VG | VG | $1 \times 10^8$ | <20 | <20 | <20 | <20 |

TABLE 14-continued

| | Viable counts of E. coli IH 3080 in TSB 1/10 | | | | | | | |
|---|---|---|---|---|---|---|---|---|
| | GO, U/ml | | | | | | | |
| CAT, U/ml | 0 | 0.004 | 0.008 | 0.016 | 0.031 | 0.063 | 0.13 | 0.25 |
| 0.00016 | VG | VG | VG | $1 \times 10^8$ | <20 | <20 | <20 | <20 |
| 0.00031 | VG | VG | VG | $1 \times 10^8$ | <20 | <20 | <20 | <20 |
| 0.00055 | VG | VG | VG | $1 \times 10^8$ | <20 | <20 | <20 | <20 |
| 0.0013 | VG | VG | VG | $1 \times 10^8$ | <20 | <20 | <20 | <20 |
| 0.0025 | VG | VG | VG | $1 \times 10^8$ | $1 \times 10^3$ | <20 | <20 | <20 |
| 0.005 | VG | VG | VG | $1 \times 10^8$ | $1 \times 10^7$ | $1 \times 10^3$ | <20 | <20 |
| 0.010 | VG | VG | VG | $1 \times 10^8$ | $1 \times 10^7$ | $1 \times 10^3$ | <20 | <20 |

VG; visible growth, not plated

EXAMPLE 6

In addition to hydrogen peroxide, GO also produces gluconic acid from glucose. To check the effect of this to the pH of the media, a series of GO dilutions was prepared without the addition of CAT. After 18 h incubation at 37° C., the pH was measured. The results were as follows:

TABLE 15

| | Effect of gluconic acid on pH | | | | | | |
|---|---|---|---|---|---|---|---|
| | GO, U/ml | | | | | | |
| Medium | 0.007 | 0.02 | 0.06 | 0.2 | 0.56 | 1.7 | 5.0 |
| | pH | | | | | | |
| TSB | 7.3 | 7.2 | 7.1 | 7.0 | 6.9 | 6.8 | 6.4 | 5.7 |
| TSB 1/10 | 7.2 | 6.8 | 6.3 | 5.4 | 4.5 | 3.9 | 3.6 | 3.4 |

EXAMPLE 7

Treated Patties

225 U/kg glucose oxidase was added on the surface of hamburger patties. the glucose oxidase—catlase ratio in the preparation was 3:1. the patties were packed in normal atmosphere. The oxygen content, pH and total microbial count were measured after 1, 7, 10, 14, 11 and 28 days after packaging. The results were compared to control sample, which was not treated with glucose oxidase and represented the normal spoilage pattern.

The results are shown in table 16.

TABLE 16

| pH oxygen content and total microbial count of hamburger patties packed in air. | | | | | | |
|---|---|---|---|---|---|---|
| | Control | | | Sample with GO | | |
| Time/ days | pH | $O_2\%$ | total count cf/g | pH | $O_2\%$ | total count cfu/g |
| 1 | 6.6 | 19.9 | $6.8 \times 10^3$ | 6.1 | 7.0 | $1.5 \times 10^4$ |
| 7 | 6.5 | 18.6 | $4.3 \times 10^3$ | 5.6 | 10.4 | $2.7 \times 10^3$ |
| 10 | 6.5 | 18.3 | $1.5 \times 10^4$ | 5.6 | 0.6 | $2.3 \times 10^3$ |
| 14 | 6.5 | 18.0 | $2.9 \times 10^5$ | 5.3 | 3.3 | $8.9 \times 10^2$ |
| 22 | 6.5 | 17.0 | $1.8 \times 10^5$ | 5.5 | 5.9 | <100 |
| 28 | — | — | — | 5.6 | 0.5 | <100 |

EXAMPLE 8

Treated Patties

30 U/kg glucose oxidase was added on the surface of hamburger patties. The glucose oxidase—catalase ratio was 3:1. The patties were packed in modified atmosphere (20% CO2+80% N2). The results are shown in Table 17.

TABLE 17

| pH, oxygen content and total microbial count of hamburger patties packed in modified atmosphere. | | | | | | |
|---|---|---|---|---|---|---|
| | Control | | | Sample with GO | | |
| Time/ days | pH | $O_2\%$ | total count cfu/g | pH | $O_2\%$ | total count cfu/g |
| 1 | 6.5 | 0.9 | $4.5 \times 10^4$ | 6.5 | 0.6 | $9.3 \times 10^3$ |
| 7 | 6.4 | 0.8 | $1.9 \times 10^3$ | 6.3 | 0.7 | $7.9 \times 10^3$ |
| 10 | 6.4 | 0.7 | $7.9 \times 10^3$ | 6.2 | 0.6 | $1.1 \times 10^4$ |
| 14 | 6.4 | 0.7 | $4.5 \times 10^4$ | 6.5 | 0.6 | $1.7 \times 10^4$ |
| 22 | 6.5 | 0.8 | $7.9 \times 10^3$ | 6.4 | 0.6 | $5.0 \times 10^3$ |
| 28 | 6.5 | 4.6 | $9.8 \times 10^4$ | 6.5 | 0.3 | $1.5 \times 10^4$ |

EXAMPLE 9

Treated Bread

400 U glucose oxidase and 5,82 g glucose was added in 400 g of rye bread. The glucose oxidase—catalase—ratio was 3:1. Breads were packed hermetically and stored at room temperature. Breads treated with glucose oxidase had no mold for 28 days, whereas the control was molded in 3 days.

We claim:

1. A method for extending the shelf life of a food product comprising: treating the product with a first preparation of substantially pure glucose oxidase and a second preparation of catalase, wherein the ratio of glucose oxidase to catalase is selected so as to maximize the anti-microbial effect of the peroxide produced by reaction of the glucose oxidase prior to its destruction by said catalase; and packaging the treated product in a sealed package, wherein the amount of glucose oxidase added is sufficient to reduce the level of oxygen in the package to under about 1% within 5 days.

2. The method according to claim 1, wherein the surfaces of the product are sprayed or coated with the solid or liquid enzyme composition.

3. The method according to claim 1 wherein said glucose oxidase is present in an amount of at least about 200 units per liter of air in the food product package.

4. The method according to claim 1 further comprising combining glucose with the enzyme composition such that the content of added glucose in the product is at least about 3.0 g/L package air.

5. The method according to claim 1 wherein said glucose oxidase and said catalase are added in a ratio of about between about 5:1 and 1:1.

6. A method for treating a foodstuff for removing pathogenic organisms comprising: treating the product with a first preparation of substantially pure glucose oxidase and a second preparation of catalase, wherein the ratio of glucose oxidase to catalase is selected so as to maximize the antimicrobial effect of the peroxide produced by reaction of the glucose oxidase prior to its destruction by said catalase; and packaging the treated product in a sealed package.

7. The method according to claim 6 wherein said glucose oxidase to catalase ratio is at least 5:1.

* * * * *